United States Patent Office 3,493,387
Patented Feb. 3, 1970

3,493,387
FOOD EMULSIFIER
Leonard J. Swicklik, Rochester, N.Y., assignor to Eastman Kodak Company, Rochester, N.Y., a corporation of New Jersey
No Drawing. Filed Sept. 22, 1966, Ser. No. 581,173
Int. Cl. A23j 7/00
U.S. Cl. 99—60    6 Claims

ABSTRACT OF THE DISCLOSURE

A novel emulsifier composition is provided comprising 2% to 8%, by weight, of hydroxylated lecithin, and 92% to 98%, by weight, of a partial ester composition containing solidified fatty acid monoesters of glycerol and fatty acid monoesters of 1,2-propane diol. The hydroxylated lecithin makes it possible to prepare a composition on a large scale having excellent whipping activity.

---

The present invention relates to emulsifiers containing partial ester compositions, and especially to such emulsifiers that can be emulsified with water to form smooth aqueous dispersions in a highly active state, and which have particular value as whipping agents for such foods as dairy products and vegetable or fruit purees. The invention also concerns improved whipped food products, and a method for making them.

In U.S. Patent 3,034,898 granted May 15, 1962 to Kuhrt and Broxholm, and assigned to Eastman Kodak Company, there are described partial ester compositions comprising predominantly mixtures of fatty acid monoesters of glycerol and fatty acid monoesters of 1,2-propanediol, wherein a substantial portion of the fatty acid monoesters of glycerol are in a normally unstable polymorphic crystalline form. The disclosure of Patent 3,034,898 is expressly incorporated herein.

The partial ester compositions contain 35 to 60 mole percent of monoesters of glycerol and 40 to 65 mole percent of the monoesters of 1,2-propanediol, with substantially equal mole proportions preferred.

The fatty acid moieties of the partial esters consist essentially of saturated fatty acid moieties having 16 to 20 carbon atoms, and include palmitoyl, stearoyl and arachidonyl radicals. Partial esters consisting essentially of palmitoyl and stearoyl moieties are preferred. At least 75, and preferably 90, mole percent of the fatty acid moieties of the monoesters of glycerol are the same as the fatty acid moieties of the monoesters of 1,2-propanediol, and less than about 5 mole percent of the fatty acid moieties being unsaturated fatty acid moieties. The fatty acid moieties can be those of hydrogenated fats and oils. The fatty acid moieties of many well-known fatty materials consist essentially of mixtures of palmitoyl and stearoyl radicals, or such fatty acid moieties as palmitoleoyl, oleoyl, linoleoyl, and linolenoyl radicals which can be converted by hydrogenation into palmitoyl or stearoyl radicals or mixtures thereof. Fatty acid moieties derived from such hydrogenated fats and oils as lard, soybean oil, cottonseed oil, peanut oil, palm oil, olive oil, beef tallow and others can comprise the fatty acid portion of the partial esters.

Substantial proportions of the partial esters of glycerol in the above compositions are in a thermodynamically normally unstable alpha polymorphic crystalline form. The partial esters of 1,2-propanediol change from the alpha polymorphic form to the beta prime (B′) polymorphic form shortly after being solidified or crystallized, and in which form they exhibit substantial stability. The polymorphic crystalline form of the partial esters can be determined from X-ray diffraction patterns or tracings and infrared curves. The partial esters of glycerol retain the alpha polymorphic crystalline form for extended periods of time, sufficient alpha crystalline stability being exhibited to afford users of these compositions the benefits from the added activity of monoglycerides in the alpha polymorphic crystalline form. Normally, monoglycerides convert readily on standing to the less active and thermodynamically stable beta polymorphic crystalline form.

The conjoined crystal compositions of the patent are excellent whipping agents in the unhydrated condition when introduced into a hot batch of the material to be whipped. However, for successful use as whipping agents in cool products, they must first be emulsified with water to form an aqueous dispersion or paste. Success has been achieved by preparing aqueous dispersions of suitable activity on a relatively small scale, such as 200 grams at a time. Surprisingly, however, attempts to prepare highly active aqueous dispersions on a large scale, as in batches greater than one kilogram at a time, have been unsuccessful. I cannot explain this phenomenon, but it has been noted that when the aqueous dispersions are prepared on a large scale following the teachings of the patent, they exhibit a waxy, viscous appearance, and supply little whipping activity when added to such foods as dairy products and vegetable or fruit purees.

I have discovered that the poor whipping activity of hydrated conjoined crystals prepared on a large commercial scale (over one kilogram) by the process of the patent can be overcome by incorporating with the conjoined crystal compositions hydroxylated lecithin as a co-emulsifier. The proportions of the ingredients in the unhydrated composition of my invention are between 92 and 98% of the conjoined crystal product of the patent, and between 2 and 8% of hydroxylated lecithin, advantageously between 3 and 5% of the latter.

The proportions of the ingredients in an active aqueous dispersion in accordance with the invention are advantageously between 5% and 50% by weight of the conjoined crystal product of the patent, 0.05% to 2% by weight of hydroxylated lecithin, with the remainder being principally water. The preferred range of conjoined crystal product is 25% to 35% by weight. It should also be understood that other ingredients in minor amount normally are added before or after mixing with water, for example, mold inhibitors in an amount from 0.1% to 0.5% of the composition by weight, such as potassium sorbate, or methyl or propyl paraben (parahydroxy benzoate); and antioxidants such as citric acid.

The most preferred form of hydroxylated lecithin is a vegetable phosphatide which in addition to phosphatidic material has an oleaginous carrier such as soy bean oil or cocoa butter. It is desirable for the purposes of the present invention that the hydroxylated lecithin be highly water dispersible but at the same time have a sufficient emulsification power for the fat phase of the system. A suitable product may be obtained by means of hydroxylation of the unsaturated bonds of higher fatty acid groups in the phosphatides, such that their degree of unsaturation is reduced. Hydroxylation is carried out using reagents or combinations thereof described in U.S. 2,445,948 or U.S. Patent 2,629,662. Actually, it has been found that when employing a hydroxylated lecithin which has an intermediate degree of saturation there is a more desired balance in the properties of water dispersibility and emulsification so that the phosphatide is most preferably only partially hydroxylated. Thus, in the case of a soy lecithin originally composed of about 65% phosphatide and 35% soy bean oil, the hydroxylated lecithin should have an iodine number in the order of 80. Such a partially saturated lecithin derivatives has the additional advantage, of course, of being more stable on storage.

The partial ester compositions are prepared by rapidly solidifying or crystallizing from the molten state the mixtures of fatty acid monoesters of glycerol and 1,2-propanediol, and the hydroxylated lecithin. Substantially concurrent solidification or crystallization of the monoester of glycerol and the monoester of 1,2-propanediol is effected. Suitable rapid solidification methods include spray-chilling methods wherein powdered or beaded products result, the powdered products usually having particles that essentially all pass through a #20 U.S. standard sieve, and are retained on a #100 sieve. The partial ester compositions can also be prepared by solidifying melts in warm water. The present mixtures of partial esters, like those of Patent 3,034,898 are close associations of the hydroxylated lecithin with two crystalline compounds, namely, the crystals of the partial esters of glycerol and the crystals of the partial esters of 1,2-propanediol, which have become known by the name "conjoined crystals."

Partial ester compositions described herein have substantial alpha crystal stability. The fatty acid moieties comprising my partial ester compositions generally are composed of less than 5 mole percent of unsaturated fatty acid moieties which tend to reduce alpha crystal stability, and preferably are substantially completely saturated, thus having low iodine values. Similarly, alpha crystal stability is reduced if the fatty acid moieties of the glycerol partial ester and the fatty acid moieties of the 1,2-propanediol partial ester are substantially different. My partial ester compositions desirably have at least 75, and preferably 90, mole percent of the same fatty acid moieties on each of the partial esters.

Aqueous dispersions of my partial ester compositions also have good alpha crystal stability. Generally such aqueous dispersions are prepared to contain about 30% to 80%, and preferably about 45% to 60%, by weight of water based on the dispersion to form dispersions having a paste-like consistency, although the amount of water used can be widely varied. Such aqueous dispersions can be prepared by agitating in water the partial ester compositions in powder form, or by dispersing a molten mixture of the partial ester compositions directly in water. By the latter method, the water is desirably first warmed to a temperature of from about 30° C. up to the melting point of the partial ester composition. The resulting aqueous dispersion can then be passed through a scraped surface cooler wherein it is allowed to cool with agitation to ambient storage or shipping temperatures. "Votating" such as described in United States Patents 2,063,065 and 2,063,066 being a particularly useful cooling and agitating method.

Sorbic acid is particularly advantageous as a mold inhibitor in aqueous dispersions of conjoined crystals because it not only functions as a mold inhibitor but also serves to impart improved properties not imparted by other common mold inhibitors such as sodium propionate. Sorbic acid is particularly useful when cationic matter such as residual catalyst materials are present in the partial ester compositions. In addition to sorbic acid and sodium propionate, other well-known mold inhibitors can be utilized in the partial ester compositions of the invention, including potassium sorbate, propionic acid, lactic acid, benzoic acid, butyric acid, and sodium, potassium or calcium salts thereof, as well as sodium diacetate and methyl and propyl paraben.

The fatty acid partial esters of glycerol and 1,2-propanediol can be prepared separately and then admixed, with the hydroxylated lecithin being mixed in before or after, to prepare the novel composition. Likewise, such mixtures can be prepared by interesterifying of triglyceride having suitable fatty acid moieties, or free fatty acids, with glycerol and 1,2-propanediol and thereafter separating out a suitable partial ester composition for addition of hydroxylated lecithin.

The monoglyceride portion of the partial ester compositions can be prepared by reacting a suitable triglyceride such as tristearin, or a suitable fatty acid such as stearic acid, or a fatty acid ester of a lower monohydric alcohol such as methyl stearate, with glycerine in the presence of an alcoholysis catalyst, and thereafter separating a purified and concentrated monoglyceride portion by thin film, high vacuum distillation, or by any other suitable separating techniques. The preparation of high purity monoglycerides by thin film, high vacuum distillation is described in United States Patents 2,634,234, 2,634,278, and 2,634,279. By substituting 1,2-propanediol for the glycerol in the reaction with the fatty acid, the monoesters of 1,2-propanediol used in the invention can be similarly prepared, camphorsulfonic acids being particularly effective catalysts. The partial esters employed in preparing the conjoined crystals are preferably high purity materials, being at least about 90% monoester such as are prepared by thin film high vacuum distillation, mixtures of mono- and diesters showing a relatively more rapid alpha to beta crystal shift.

Antioxidants or stabilizers also are included in the conjoined crystal compositions in small amount, e.g., .02% by weight, including such antioxidants as citric acid, 2,6-ditertiary-butyl-4-methylphenol, butylated hydroxyanisole and mixtures thereof, tocopherol, and other well-known antioxidants for fat or oleaginous materials. Mixtures of glycine and phosphoric acid, such as are described in United States Patent 2,701,769, are particularly effective.

My novel hydrated emulsifiers are advantageous for improving the whipping characteristics of foods such as dairy products (e.g. homogenized cream, and reconstituted dried milk), and vegetable and fruit purees, when added in an amount between 2% and 8% by weight of the food. Even in the unhydrated condition they improve the whipping of hot foods such as freshly cooked vegetable and fruit purees.

EXAMPLE I

A fat phase was made up with five kilograms of a partial ester composition in accordance with the above patent marketed under the trademark Myvatex Food Emulsifier Type 3–50, to which was added 200 grams of hydroxylated lecithin marketed under the trademark Centrolene S, and the mixture was heated to 160° F. The Myvatex Type 3–50 contained 42 parts by weight of a monoglyceride product distilled from a reaction mixture of glycerol and fully hydrogenated soybean oil and had a total monoglyceride content of 95%, together with 0.02% citric acid as an antioxidant. It also contained 58% by weight of the propylene glycol monoester of fully hydrogenated soybean oil, containing 90% of monoester content.

The water phase containing 14.76 kilograms of water and 40 grams of potassium sorbate was heated in a steam jacketed mixing tank to 160° F. Then with good agitation, the fat phase was added to the water phase (both phases being at 160° F.) and the mixture was slowly cooled with agitation to 125° F. to 128° F., at which point a smooth fluid emulsion resulted. The resulting emulsion was passed through a scraped surface cooler and chilled to 105° F. to 115° F. to provide a smooth stable active paste of creamy consistency.

EXAMPLE II

Following the procedure of Example I, but adding in the fat phase 20 grams of methyl paraben in one instance and propylparaben in another instance (instead of potassium sorbate in the water phase), a similar emulsion was obtained. In both instances under this example the water phase amounted to 14.96 kilograms.

EXAMPLE III

Emulsifiers were tested for the whipping of 200 grams of applesauce to which were added 16 grams of the aqueous Myvatex 3–50 paste or dispersion in accordance with Patent 3,034,898, and in accordance with Examples I and II above, respectively.

The applesauce and emulsifier were added to a one quart Hamilton Beach household type mixing bowl (Model K) and mixed at maximum mixer speed for five minutes. The percent overrun of the mass of applesauce was determined by measuring the weight of a measured volume of the applesauce, subtracting from it the weight of the same volume of whipped applesauce, dividing the difference by the weight of the same volume of whipped applesauce, and multiplying the quotient by 100. The following results were obtained:

TABLE I

| Emulsifier | Description | Percent Overrun | Activity |
|---|---|---|---|
| Type 3–50 (no co-emulsifier). | Waxy | 157 | Inactive. |
| Example I Product | Smooth, creamy | 637 | Active. |
| Example II Product | do | 705 | Do. |

An important attribute of an emulsifier for whipping foods is its ability to retain activity over a long period of time, such as six months. The activity of the product of Example II was determined and it was found that in the whipping of applesauce the following results were obtained measured in percent overrun: After one day, 707%; after two weeks, 666%; after one month, 685%; after three months, 630%. These results confirm the superior activity of the product of this invention even after the lapse of a substantial period of time.

The activity of aqueous pastes can be preliminarily appraised by microscopic examination of the pastes. Photomicrographs of active pastes at a magnification of 250× show discrete spherical particles and only slight evidence of crystallinity, whereas photomicrographs of inactive pastes at 250× magnification shows a fibrous, interlocking and essentially crystalline structure.

A second method for preliminary distinguishing active from inactive pastes involves centrifugation at 2,800 r.p.m. for ten minutes. Active pastes are such tightly bound emulsion systems that no water separates out when subjected to this treatment. Inactive pastes, in contrast, are less sturdy emulsions and water is readily separated by centrifugation.

The present invention thus provides novel partial ester compositions having improved water dispersibility on a large commercial scale, and improved foaming or frothing properties. Such improved properties lend to the present compositions considerable utility as whipping or foaming agents for vegetable or fruit purees and the like. For example, small amounts of the present compositions can be utilized to whip applesauce to a high overrun having a stiff texture, and which whipped applesauce can be subjected to foam-mat drying at a faster rate and at a lower temperature than can be utilized with applesauce whipped with conventional monoglyceride whipping agents. The present compositions also have utility in the preparation of whipped dairy products, toppings, confections and the like. Hence, the present invention is a substantial contribution to the art.

Although the invention has been described in detail with particular reference to certain typical embodiments thereof, it will be understood that variations and modifications can be effected within the spirit and scope of the invention as described hereinabove and as defined in the appended claims.

I claim:

1. An emulsifier comprising 2% to 8% by weight of hydroxylated lecithin, and 92% to 98% by weight of a partial ester composition containing concurrently solidified fatty acid monoesters of glycerol and fatty acid monoesters of 1,2-propanediol, said partial ester composition containing 35 to 60 mole percent of said monoesters of glycerol and 40 to 65 mole percent of said monoesters of 1,2-propanediol, a substantial portion of said monoesters of glycerol being in a normally unstable polymorphic form, the fatty acid moieties of said monoesters consisting essentially of saturated fatty acids having 16 to 20 carbon atoms, at least about 75 mole percent of the fatty acid moieties of said monoesters of glycerol being the same as the fatty acid moieties of said monoesters of 1,2-propanediol, and less than about 5 mole percent of the fatty acid moieties comprising said partial ester composition being unsaturated fatty acid moieties; said emulsifier being characterized by the ability to mix with water and form a dispersion having the ability to improve the whipping of cool foods.

2. An emulsifier in accordance with claim 1 wherein the fatty acid moieties are predominantly stearoyl moieties.

3. A hydrated emulsifier composition comprising the emulsifier in accordance with claim 1, also containing water intimately mixed therewith in an amount between 30% and 80% by weight, said hydrated emulsifier composition being characterized by the ability to improve the whipping of cool foods.

4. In the whipping and aerating of a cool food product, incorporating in said food product in a cool condition a small quantity between 2% and 8% by weight of the hydrated emulsifier in accordance with claim 3.

5. The process which comprises providing a composition in the molten state comprised (A) 92% to 98% by weight of a mixture of fatty acid monoesters of glycerol and fatty acid monoesters of 1,2-propanediol, and (B) 2% to 8% by weight of hydroxylated lecithin; said mixture containing 35 to 60 mole percent of said monoesters of glycerol and 40 to 65 mole percent of said monoesters of 1,2-propanediol, and thereafter rapidly cooling said molten composition to concurrently solidify said monoesters and form a solid composition wherein a substantial portion of said monoesters of glycerol are in a normally unstable polymorphic crystalline form, the fatty acid moieties of said monoesters consisting essentially of saturated fatty acids having 16 to 20 carbon atoms, at least about 75 mole percent of the fatty moieties of said monoesters of glycerol being the same as the fatty acid moieties of said monoesters of 1,2-propanediol, and less than about 5 mole percent of the fatty acid moieties comprising said partial ester composition being unsaturated fatty acid moieties; said solid composition being characterized by the ability to mix with water and form a dispersion having the ability to improve the whipping of cool foods.

6. The process in accordance with claim 5, also comprising the step of mixing said solid composition with an amount of water between 30% and 80% by weight of the resulting mixture and forming a hydrated emulsifier composition characterized by the ability to improve the whipping of cool foods, said mixture exceeding 1 kilogram in weight.

References Cited

UNITED STATES PATENTS

| | | | |
|---|---|---|---|
| 3,034,898 | 5/1962 | Kuhrt et al. | 99—91 |
| 3,121,013 | 2/1964 | Glabe | 99—15 X |
| 3,158,487 | 11/1964 | Reid | 99—123 X |
| 3,164,476 | 1/1965 | Dalby et al. | 99—91 X |
| 3,210,198 | 10/1965 | Keller | 99—139 |
| 3,282,705 | 11/1966 | Hansen | 99—91 X |

A. LOUIS MONACELL, Primary Examiner

D. M. NAFF, Assistant Examiner

U.S. Cl. X.R.

99—15, 91, 101, 139, 134; 252—356